United States Patent [19]

Kopnski

[11] Patent Number: 5,104,169
[45] Date of Patent: Apr. 14, 1992

[54] HANDICAP ASSIST APPARATUS

[76] Inventor: Thomas L. Kopnski, Rte. 3, Box 469, Morgantown, W. Va. 26505

[21] Appl. No.: 742,416

[22] Filed: Aug. 8, 1991

[51] Int. Cl.$^5$ ............................................. B60R 27/00
[52] U.S. Cl. ..................... 296/1.1; 248/339; 5/81.1
[58] Field of Search ................ 296/1.1; 248/339, 342, 248/343; 272/68, 117, 112, 136, 261, 143; 5/81 R, 503; 128/75; 16/111 R

[56] References Cited

U.S. PATENT DOCUMENTS

| | | | |
|---|---|---|---|
| 4,174,087 | 11/1979 | Gains | 248/339 |
| 4,375,707 | 3/1983 | Boerigter | 5/81 R |
| 4,626,016 | 12/1986 | Bergsten | 296/1.1 |
| 4,775,127 | 10/1988 | Nakamura | 248/339 |

Primary Examiner—Robert R. Song
Attorney, Agent, or Firm—Leon Gilden

[57] ABSTRACT

An apparatus arranged for securement to a roof positioned above a passenger compartment of a vehicle, wherein the structure includes a grasping tube receiving a flexible tether line therethrough, wherein the tether line is mounted to a securement loop and the loop is pivotally mounted to a hook clamp that is releasably mounted to the roof of the vehicle. A modification of the invention includes a plate structure with a loop member adjustably mounted longitudinally of the plate to provide selective orientation of the tether line and tube within the passenger compartment.

3 Claims, 4 Drawing Sheets

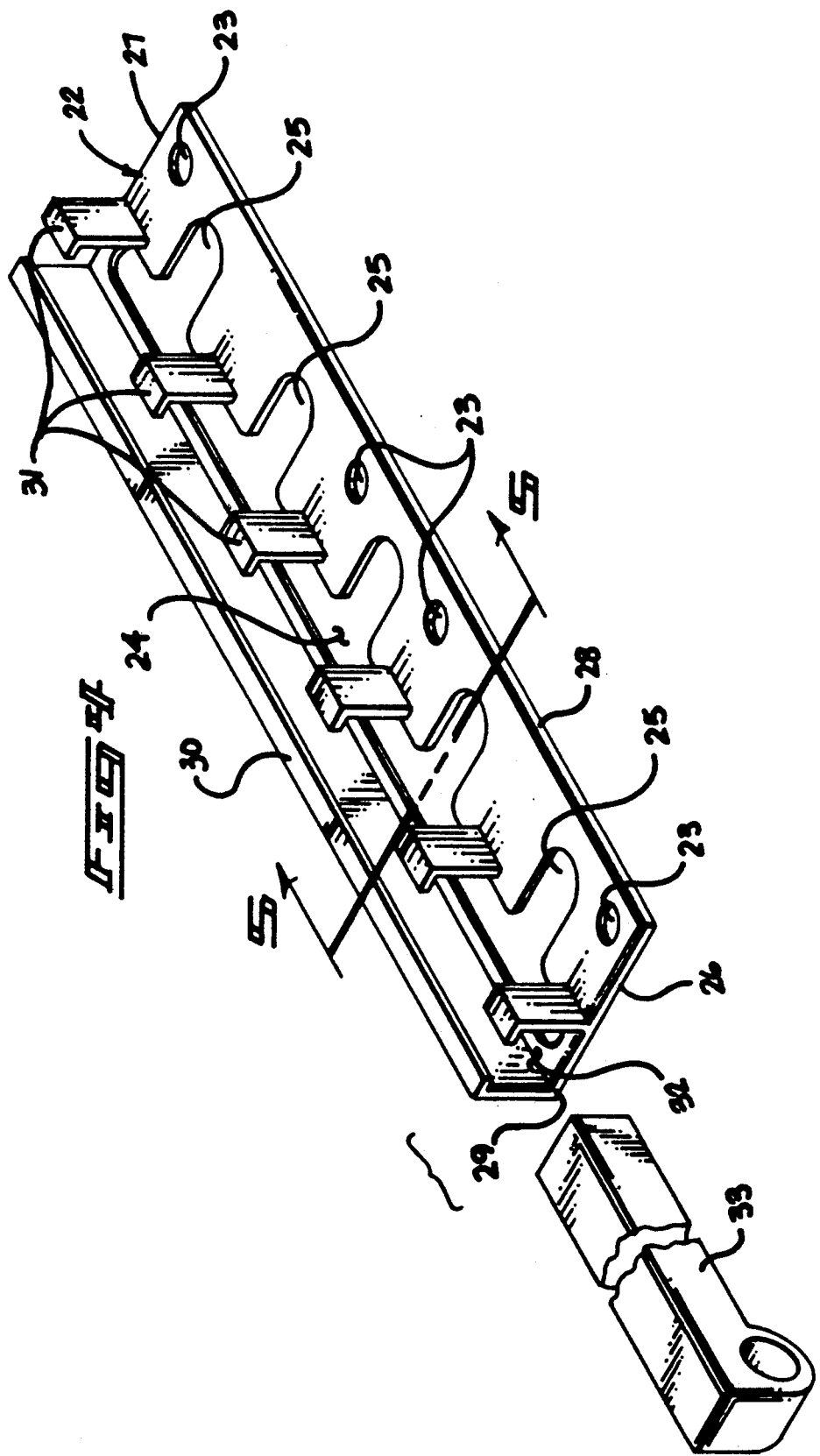

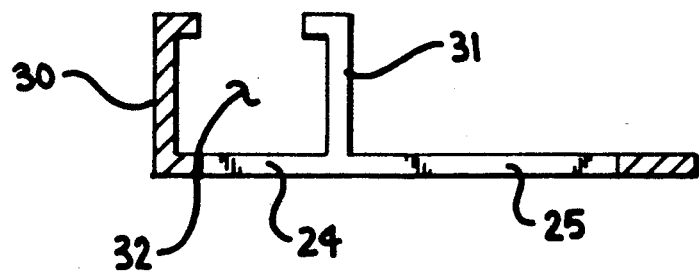
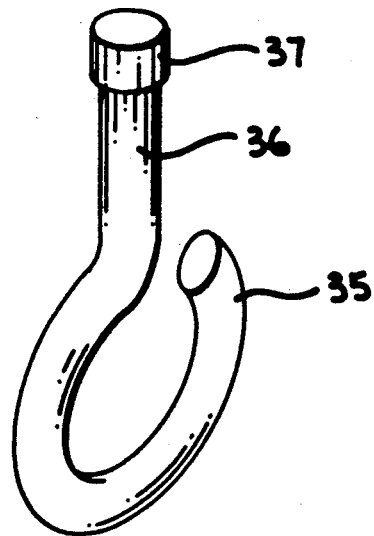

HANDICAP ASSIST APPARATUS

BACKGROUND OF THE INVENTION

1. Field of the Invention

The field of invention relates to support apparatus, and more particularly pertains to a new and improved handicap assist apparatus wherein the same is mounted within a vehicle to enhance ease of entry and exit from the passenger compartment of the vehicle by an individual of limited or diminished physical capacity.

2. Description of the Prior Art

Various support apparatus is utilized in the prior art for a variety of purposes to support individuals in a myriad of applications. For example U.S. Pat. No. 1,529,467 to Davis, et al. sets forth exercise apparatus wherein various tubes and loops are mounted within a gymnastic arrangement for support of individuals.

U.S. Pat. No. 4,531,514 to McDonald, et al. sets forth a traction apparatus wherein a bar member is mounted to a tether line for support of an individual's leg in a traction arrangement for physical therapy.

U.S. Pat. No. 2,706,632 to Chandler sets forth physical therapy apparatus wherein a variety of loops are mounted relative to tether lines for support of an individual.

U.S. Pat. No. 1,585,748 to Wendelken sets forth an exercise apparatus arranged for exercise of an individual utilizing a main support, with a plurality of spring means mounting handles at their lower terminal ends.

As such, it may be appreciated that there continues to be a need for a new and improved handicap assist apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of support apparatus now present in the prior art, the present invention provides a handicap assist apparatus wherein the same is arranged for mounting within a vehicle for providing a grasp bar for ease of entry and exit of the associated vehicle As such, the general purpose of the present invention, which will be described subsequently in greater detail, is to provide a new and improved handicap assist apparatus which has all the advantages of the prior art support apparatus and none of the disadvantages.

To attain this, the present invention provides an apparatus arranged for securement to a roof positioned above a passenger compartment of a vehicle, wherein the structure includes a grasping tube receiving a flexible tether line therethrough, wherein the tether line is mounted to a securement loop and the loop is pivotally mounted to a hook clamp that is releasably mounted to the roof of the vehicle. A modification of the invention includes a plate structure with a loop member adjustably mounted longitudinally of the plate to provide selective orientation of the tether line and tube within the passenger compartment.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S Patent and Trademark Office and the public generally, and especially the scientists, engineers and practitioners in the art who are not familiar with patent or legal terms phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved handicap assist apparatus which has all the advantages of the prior art support apparatus and none of the disadvantages.

It is another object of the present invention to provide a new and improved handicap assist apparatus which may be easily and efficiently manufactured and marketed.

It is a further object of the present invention to provide a new and improved handicap assist apparatus which is of a durable and reliable construction.

An even further object of the present invention is to provide a new and improved handicap assist apparatus which is susceptible of a low cost of manufacture with regard to both materials and labor, and which accordingly is then susceptible of low prices of sale to the consuming public, thereby making such handicap assist apparatus economically available to the buying public.

Still yet another object of the present invention is to provide a new and improved handicap assist apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric illustration of a modified support plate utilized, by the invention FIG. 5 is an orthographic view, taken along the lines 5—5 of FIG. 4 in the direction indicated by the arrows.

FIG. 6 is an isometric illustration of a support loop utilized by the instant invention in association with the support plate, as illustrated in FIGS. 4 and 5.

DESCRIPTION OF THE PREFERRED EMBODIMENT

Figure 1:
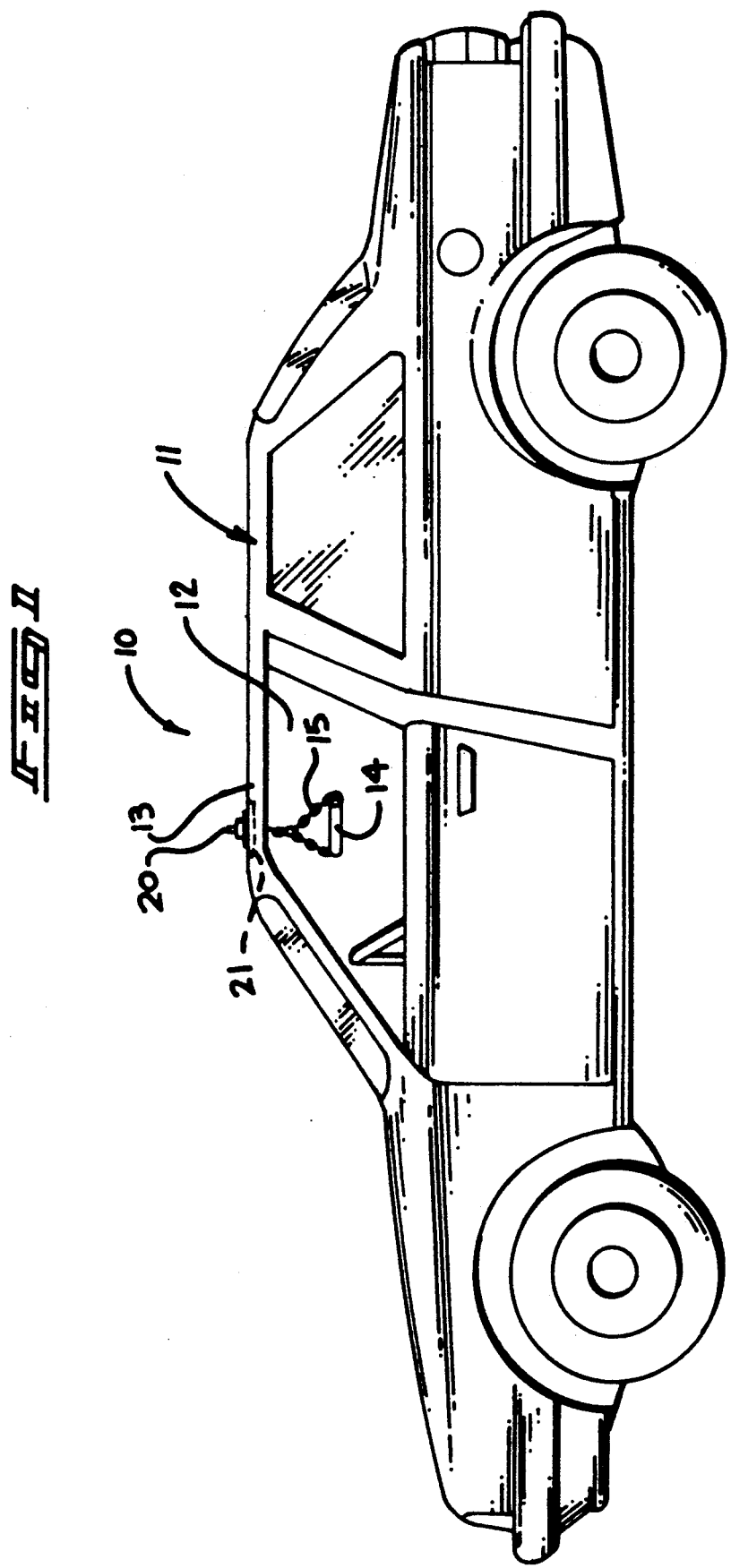
FIG. 1 is an orthographic side view of the apparatus in association with a vehicle.

With reference now to the drawings, and in particular to FIGS. 1 to 6 thereof, a new and improved handicap assist apparatus embodying the principles and concepts of the present invention and generally designated by the reference numeral 10 will be described.

Figure 2:
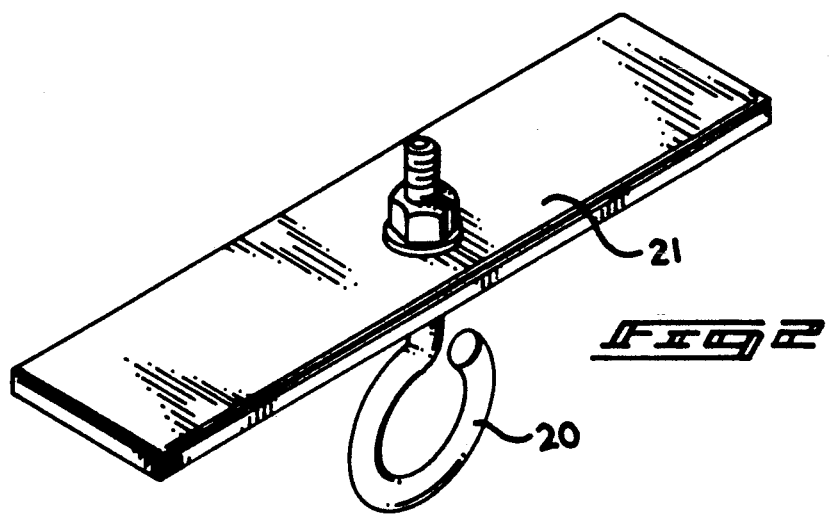
FIG. 2 is an isometric illustration of the support plate utilized by the invention.
Figure 3:
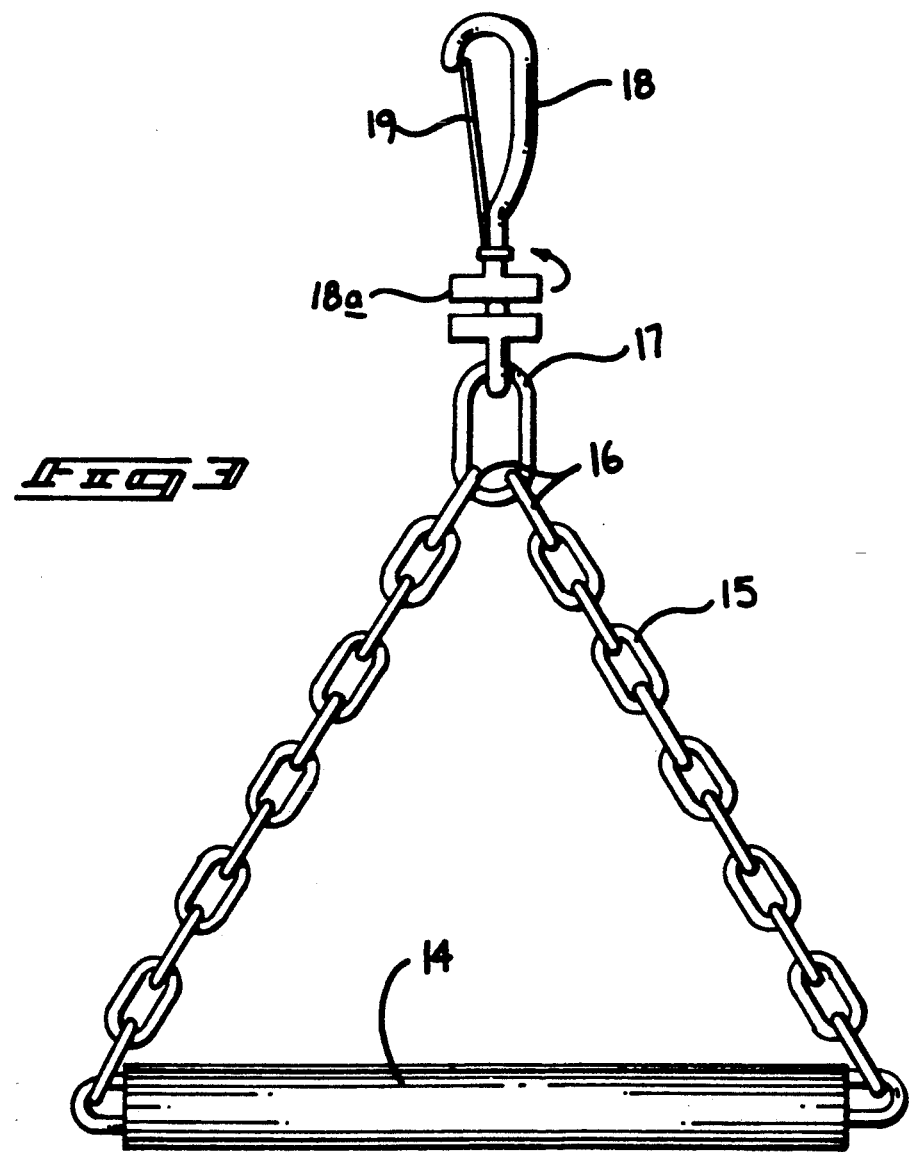
FIG. 3 is an isometric illustration of the tether line and support tube utilized by the invention.

More specifically, the handicap assist apparatus 10 of the instant invention essentially comprises association with a motor vehicle 11 defined by a passenger compartment 12, including a passenger compartment roof 13 extending above the passenger compartment relative to the vehicle 11. A support tube 14 is provided, including a flexible tether loop directed through the support tube, with the tether loop including loop terminal ends 16 joined together by a pivot link 17. The pivot link 17 pivotally mounts a support hook 18 thereon. The support hook 18 includes a swivel connection 18a and a spring lock plate 19 in a biased relationship to overlie the opening of the support hook 18 that is displaced to permit its securement to an associated mounting hook 20, as illustrated in FIG. 2 The mounting hook 20 in turn is mounted to a mounting plate 21 that is secured to the roof 13. The plate 21 may be mounted above or below the roof, but is typically above the roof to provide the support plate with the mounting hook and an associated threaded shaft portion of the hook directed through the plate and roof structure, in a manner as illustrated in FIG. 1. If required, a further mounting plate 21 may be positioned below the roof to effectively sandwich the roof 11 therebetween.

FIG. 4 illustrates the use of a modified mounting plate 22 for securement to an interior surface of the roof 11 to overlie the passenger compartment, wherein the modified mounting plate 22 includes a plurality of mounting apertures 23 to receive fasteners therethrough and to the roof to secure the plate to the roof. An enclosed primary slot 24 is longitudinally directed of the mounting plate 22 extending from a first end edge 26 to a second end edge 27. The mounting plate includes respective first and second sides 28 and 29 to define the rectangular mounting plate. A series of intersecting slots 25 intersect the primary slot 24 in communication therewith at equally spaced intervals along the primary slot 24. A first "L" shaped flange 30 is coextensive with and integrally and orthogonally mounted to the second side edge 29 in confronting relationship to a series of equally spaced second "L" shaped flanges 31 to define a parallelepiped channel 32. The channel 32 complementarily receives a parallelepiped bolt 33. The predetermined cross-sectional configuration of the channel 32 is substantially equal to the predetermined cross-sectional configuration of the bolt 33. A support loop 35 is provided to receive the support hook 18 thereon, wherein the support loop 35 includes a shank 36 that terminates at its upper terminal end with a boss head 37.

The boss head 37 is defined by a predetermined diameter substantially greater than a predetermined width defined by the primary slot 24 and the intersecting slots 25 to permit the boss head 37 to ride above the slot 24 and the intersecting slots 25 to permit its positioning within one of the intersecting slots and thereby provide linear adjustment of the support loop 35 along the plate 22. When the boss head 37 is positioned within one of the intersecting slots 25, the bolt 33 is thereafter directed into the channel 32 to thereby prevent the boss head 37 from being withdrawn from one of the preselected intersecting slots 25. In this manner, the longitudinal adjustment of the support loop 35 permits associated adjustment and positioning of the support tube 14 within the passenger compartment 12 to accommodate a variety of individuals relative to the vehicle 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A handicap assist apparatus for mounting within a self-propelled vehicle, wherein the vehicle includes a passenger compartment and a roof positioned above the passenger compartment, and a mounting plate mounted to the passenger compartment, the mounting plate including a support loop, and a support hook releasably mounted to the support loop, the support hook including a spring lock plate extending to overlie an opening of the support hook to permit access of the support loop within the support hook, and the support hook mounted to a pivot link, and an elongate flexible tether loop of a finite length, including a plurality of terminal ends, and the terminal ends mounted within the pivot link, and the tether loop extending through a support tube, the support tube positioned below the pivot link and the mounting plate.

2. An apparatus as set forth in claim 1 wherein the mounting plate includes a first side edge spaced from a second side edge, and a first end edge spaced from a second end edge, and an elongate enclosed primary slot extending from a first position adjacent the first end edge to a second position adjacent the second edge longitudinally of the mounting plate, and a series of equally spaced intersecting slots in communication with a primary slot intersecting the primary slot at spaced intervals throughout the mounting plate and extending from the primary slot to the first side edge, and a first "L" shaped flange integrally and orthogonally mounted to the mounting plate coextensively with the second side edge, and a series of equally spaced second "L" shaped flanges each arranged parallel to the first "L" shaped flange and in alignment relative to one another to define a parallelepiped channel between the first "L" shaped flange and the second "L" shaped flanges, wherein the parallelepiped channel is defined by a predetermined crosssectional configuration, and a parallelepiped bolt removably mounted within the channel defined by a cross-sectional configuration equal to the predetermined cross-sectional configuration, with the support loop adjustably mounted within the primary slot and the intersecting slots.

3. An apparatus as set forth in claim 2 wherein the support loop includes a shank, and the shank has fixedly mounted to an upper terminal end thereof a boss head, and the primary slot and the intersecting slots are each defined by a predetermined width, and the boss head is defined by a predetermined diameter greater than the predetermined width to slidably capture the boss head within the primary slot and the intersecting slots.

* * * * *